W. H. SCHERFFIUS.
BISCUIT CUTTER.
APPLICATION FILED NOV. 2, 1915.
1,172,057.
Patented Feb. 15, 1916.
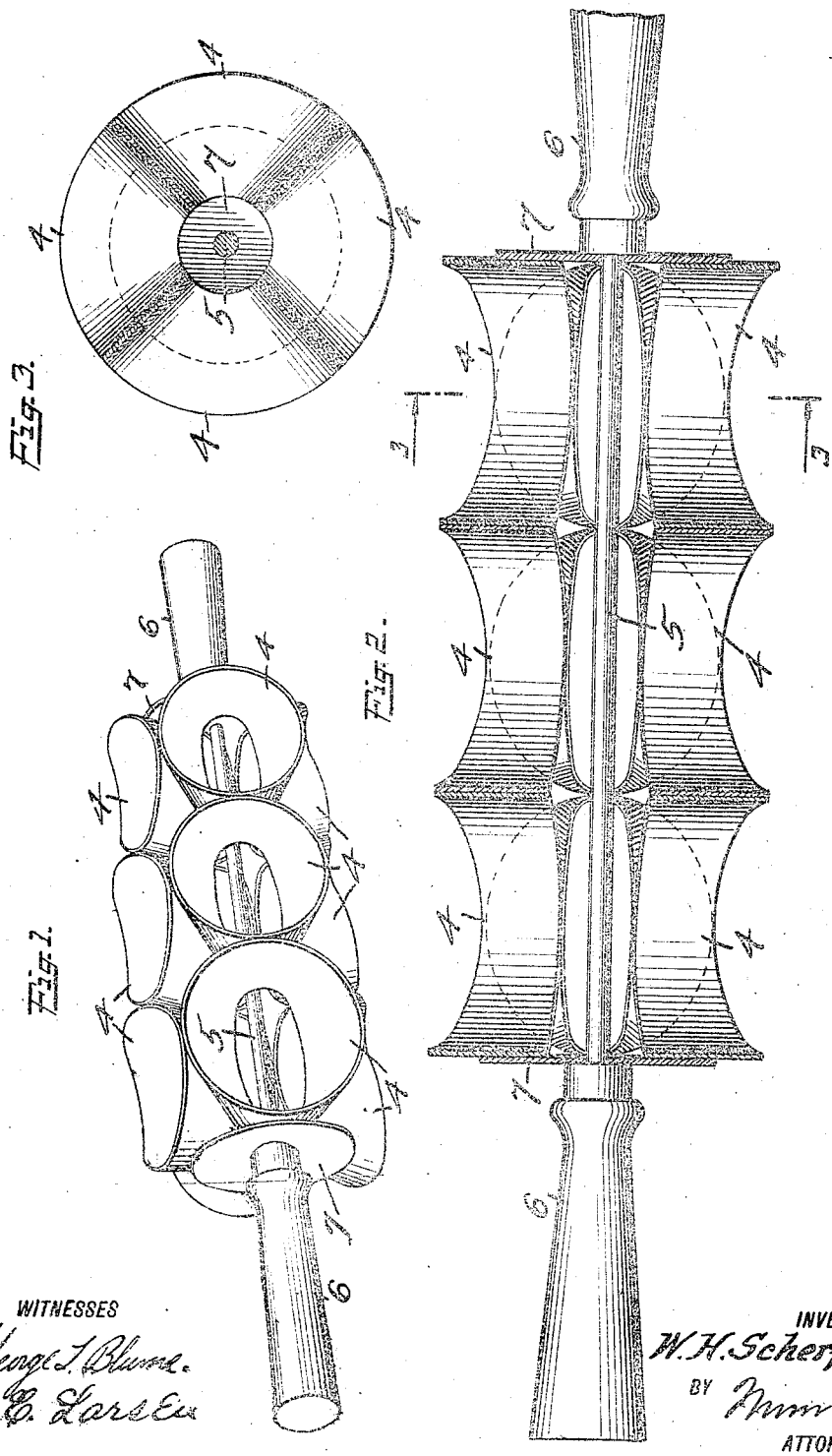
WITNESSES
INVENTOR
W. H. Scherffius
BY
ATTORNEYS

UNITED STATES PATENT OFFICE.

WILLIAM HURLEY SCHERFFIUS, OF MUSKOGEE, OKLAHOMA, ASSIGNOR OF ONE-HALF TO CHARLES GOBLE, OF MUSKOGEE, OKLAHOMA.

BISCUIT-CUTTER.

1,172,057.       Specification of Letters Patent.       Patented Feb. 15, 1916.

Application filed November 2, 1915. Serial No. 59,225.

*To all whom it may concern:*

Be it known that I, WILLIAM H. SCHERFFIUS, a citizen of the United States, and a resident of Muskogee, in the county of Muskogee and State of Oklahoma, have invented certain new and useful Improvements in Biscuit-Cutters, of which the following is a specification.

My invention relates to biscuit cutters, and the main object thereof is to provide a utensil by means of which large numbers of circular or otherwise shaped portions may be quickly cut from a slab of dough, said utensil being used in the manner of a rolling-pin.

My invention is fully described in the following specification, of which the accompanying drawings form a part, in which like characters refer to like parts in each of the views, and in which:—

Figure 1 is a perspective view of my invention, ready for use; Fig. 2 is a longitudinal section therethrough; and Fig. 3 is a section taken on the line 3—3 of Fig. 2.

My invention consists of a plurality of sheet metal cutters 4 of cup-shape arranged in sets, the cutters of each set being soldered or otherwise secured to each other to form a circle, substantially, and the different sets being successively soldered or otherwise secured together to obtain a desired length to the utensil, and to obtain a maximum number of cutters for a given length.

The cutters are formed of sheet metal of ribbon form whereby they are open at their inner ends, and I employ no cylinder or other base for carrying the cutters, the cutters when secured together forming a unit through which is passed a rod 5 provided with handles 6 whereby the utensil may be rolled over the slab of dough to cut portions therefrom in such manner as to secure a maximum number of biscuits from a given area of the slab of dough.

The ends of the unit formed by the connected cutters may have disks 7 soldered or otherwise secured thereto which serve as bearings for the rod 5, and the utensil when assembled constitutes a simple, sanitary, highly efficient, and relatively inexpensive article of manufacture.

I do not limit myself to the particular shape of the cutters shown, nor to the number arranged circumferentially or longitudinally, nor to the material of which the utensil is made, my main object being to provide as simple and efficient a utensil as possible, and which is very easy to keep clean.

Having fully described my invention, what I claim as new, and desire to secure by Letters Patent, is:—

1. A utensil of the class described, comprising a plurality of cutters soldered together to form a substantially cylindrical article and a handled rod passed axially therethrough, each of said cutters having a circular outer end and an inner end elongated along the axis of said article whereby the ends are parallel and the sides are inwardly tapered, the contacting ends and the contacting sides being soldered together on planes perpendicular to said rod.

2. A utensil of the class described, comprising a plurality of cutters soldered together to form a substantially cylindrical article, and a handled rod passed axially therethrough, each of said cutters having a circular outer end and an inner end elongated along the axis of said article whereby the ends are parallel and the sides are inwardly tapered, the contacting ends and sides being soldered together, and a disk soldered to each end of said cylindrical article having perforations for said rod and serving as bearings therefor.

In testimony whereof I have signed my name to this specification in the presence of two subscribing witnesses.

WILLIAM HURLEY SCHERFFIUS.

Witnesses:
MURIEL WOODS,
T. O. ABERNATHY.